2 Sheets--Sheet 1.

R. B. SHELDON.
Horse Hay-Rakes.

No. 137,389. Patented April 1, 1873.

Witnesses:
A. W. Almqvist
C. Sedgwick

Inventor:
R. B. Sheldon
PER
Attorneys.

R. B. SHELDON.
Horse Hay-Rakes.
No. 137,389. Patented April 1, 1873.
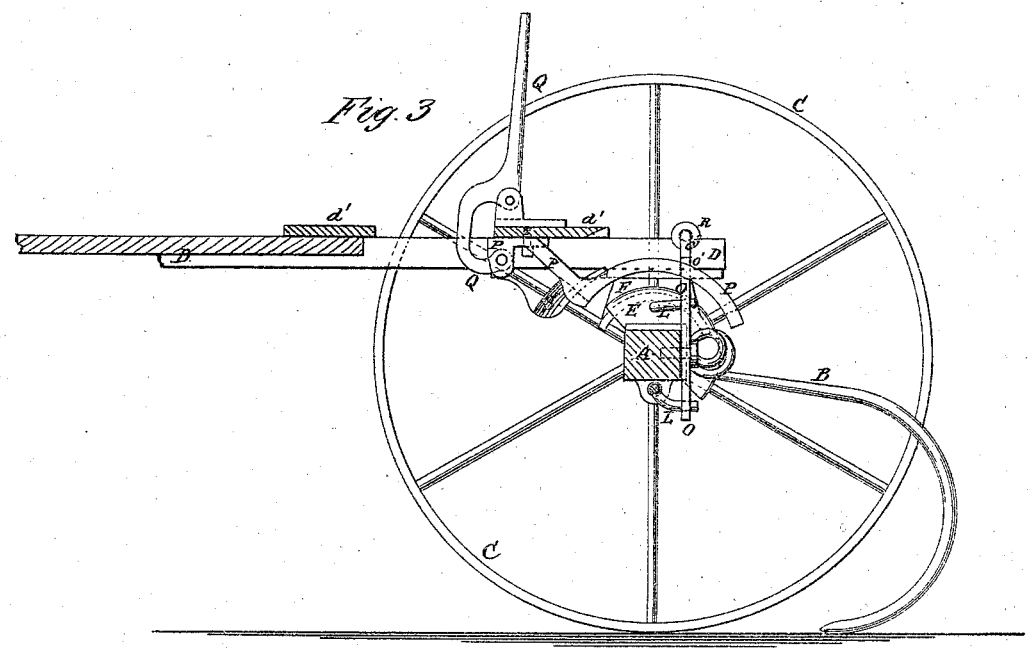
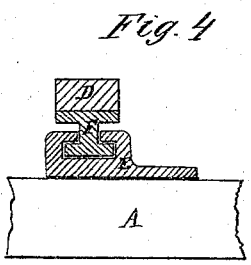
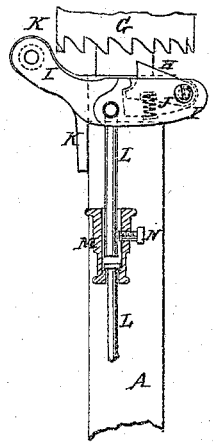
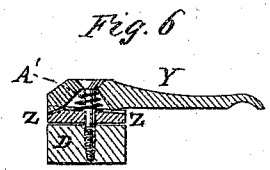
Witnesses: A. W. Almquist, Sedgwick
Inventor: R. B. Sheldon
per Attorneys

UNITED STATES PATENT OFFICE.

RICHARD B. SHELDON, OF CANASTOTA, NEW YORK.

IMPROVEMENT IN HORSE HAY-RAKES.

Specification forming part of Letters Patent No. 137,389, dated April 1, 1873; application filed January 11, 1873.

*To all whom it may concern:*

Figure 1:
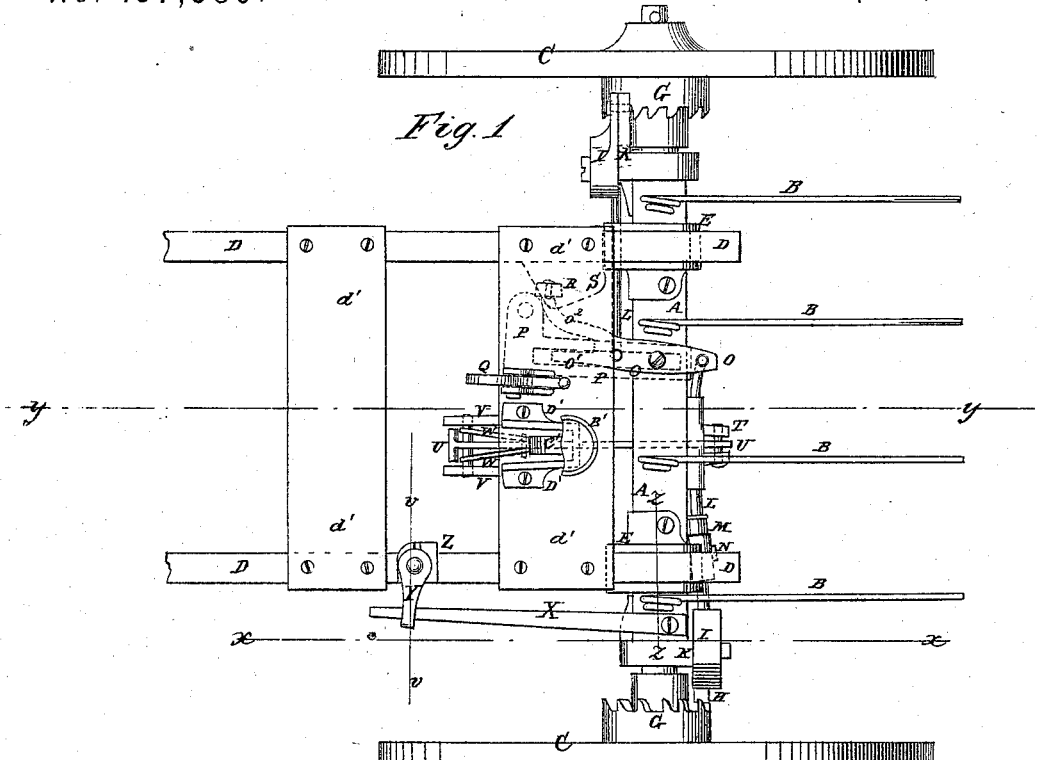
Figure 2:
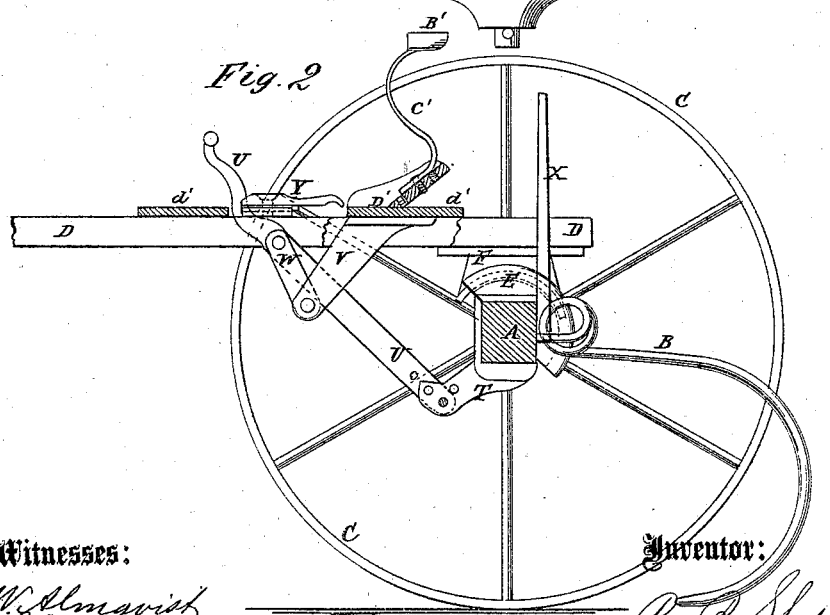

Be it known that I, RICHARD B. SHELDON, of Canastota, in the county of Madison and State of New York, have invented a new and useful Improvement in Horse Hay-Rake, of which the following is a specification:

Figure 1, Sheet 1, is a top view of my improved hay-rake. Fig. 2, Sheet 1, is a detail vertical section of the same, taken through the line $x\ x$, Fig. 1. Fig. 3, Sheet 2, is a detail vertical section of the same, taken through the line $y\ y$, Fig. 1. Fig. 4, Sheet 2, is a detail section, taken through the line $z\ z$, Fig. 1. Fig. 5, Sheet 2, is a detail view of the ratchet-wheel, pawl, and part of the extension connecting-rod, the adjusting-sleeve being shown in section. Fig. 6, Sheet 2, is a detail section, taken through the line $v\ v$, Fig. 1.

My invention has for its object to furnish an improved sulky or riding horse hay-rake, which shall be so constructed that it may be readily controlled by the operator, and which shall, at the same time, be simple in construction, strong, durable, and not liable to get out of order. The invention consists in the pivoted pawls, in combination with the ratchet-wheels attached to the hubs of the drive-wheels, and with the axle of a horse hay-rake; in the hinged form of the semicircular T-grooved piece, and the semicircular T-flanged piece, in combination with the axle and thills of a horse hay-rake; in the combination of the extension connecting-rods, pivoted lever, and hand-lever with the pawls to throw said pawls into gear with the ratchet-wheels; in the combination of the outwardly-projecting branch or arm and curved or inclined trip-plate with the pivoted lever, extension connecting-rods, and pawls, to throw said pawls out of gear with the ratchet-wheels of the drive-wheels automatically; in the combination of the slotted rigid arm, the foot-lever, the pivoted connecting-bars, and the slotted rigid arm with the axle to which the rake-teeth are attached, as hereinafter fully described.

A represents the axle, to the rear side of which are attached the spring-wire rake-teeth B, and upon the journals of which the wheels C revolve. D are the thills, which are connected and held in their proper relative positions by cross-bars $d'$, which may be made wide to adapt them to serve as a platform. The rear parts of the thills D are connected to the axle A by hinges E F. The part E of the hinge is secured to the axle A, extends around the upper and rear sides of the axle A, and has an upward-projecting semicircular flange formed upon it, in which is formed a T-groove to receive the semicircular T-flange formed upon the part F of the hinge, which part is attached to the rear part of the thills D.

By this construction of the hinge the weight will always be directly over the axis of the axle A, whatever may be the position of the operating parts of the machine.

To the inner ends of the hubs of the wheels C are attached, or upon them are formed, ratchet-wheels G, upon the teeth of which the tooth H of the pawls H I J takes hold. The tooth H is placed in a recess formed in and is pivoted to the block I, and is held out by a coiled spring, J, placed in the recess in the block I, and which presses against the inner side of said tooth H. The spring J allows the tooth H to yield as the wheel C is turned backward, the teeth of the ratchet-wheel G pressing the said tooth H inward, and sliding over it. The block I rests upon a support, K, attached to the axle A, to which support it is pivoted at the end furthest from the tooth H. To the blocks I are pivoted the outer ends of the connecting-rods L, which are made in two parts. The adjacent ends of the parts of rods L are adjustably connected by a stem, M, and set-screws N, as shown in Fig. 5, so that the length of the said connecting-rods may be conveniently adjusted as may be required. The pawls H I J are arranged the one above and the other below the axle A, and the connecting-rods L project inward, one above and the other below the axle A. The inner ends of the rods L are pivoted to the opposite ends of the lever O at equal distances above and below its pivoting point, as shown in Figs. 1 and 3. The upper end of the lever O is forked, one branch, $o^1$, passing through the slot in the curved rear or long arm of the elbow-lever P, the end of the short arm of which rests against and is pivoted to the lower side of the rear cross-bar $d'$ of the thills D. The short arm of the lever P is made wide, so as to hold said lever securely in a horizontal position while being operated. To the angle-lever P, at its angle, is pivoted the lower end of the lever Q, the lower part of which is curved to pass around the forward edge of the rear cross-bar $d'$ of the thills D. The lever Q is pivoted to a support attached to the upper side of the rear cross-bar of the thills D, and its upper end projects into such a position that it may be conveniently reached and operated by the driver from his seat. The other branch, $o^2$, of the lever O is bent outward and has a small roller, R, attached to its end, which, as the upper end of the lever O moves forward in dumping, the rake strikes and rolls along the surface of the curved or inclined plate S attached to a thill, D. By this construction, when the rake is loaded a slight forward movement of the lever Q will operate the lever O to project the pawls H I J into contact with the ratchet-wheels G, so that the revolution of the wheels C may raise the rake-teeth B to dump the load. As the load drops from the teeth B the roller R comes in contact with the curved plate S, which pushes the lever O back, withdrawing the pawls H I J from the ratchet-wheels G, and allowing the teeth B to drop to the ground from their own weight. To the under side of the axle A is attached an arm, T, projecting forward and downward, and which is slotted to receive the lower end of the lever U. The ends of the arm T and lever U have several holes formed in them to receive the pin or bolt by which they are pivoted to each other, so that by shifting the said pin or bolt the relative position of the pivoting point may be adjusted as desired. The lever U passes through the downwardly-projecting slotted arm V attached to the rear cross-bar $d'$ of the thills D. To and between the lower ends of the slotted arm V are pivoted the lower ends of the two connecting-bars W, the upper ends of which are pivoted to the opposite sides of the upper part of the lever U. The upper part of the lever U projects above the cross-bar $d'$ of the thills D into such a position that its upper end may be conveniently reached and operated by the driver with his feet. By this arrangement, by pressing downward and forward upon the upper end of the lever U the rake-teeth B will be held down firmly to their work. By moving the upper end of the lever U to the rearward and pressing it downward, the teeth B will be raised from the ground for convenience in passing over any obstruction. X is an upwardly-projecting lever, the lower end of which is rigidly attached to the rear side of the axle A. To the thill D is pivoted a button, Y, one end of which projects so much that it may be turned over the lever X when said lever is turned down into a horizontal position to hold the teeth B away from the ground for convenience in passing from place to place. The button Y is pivoted to a washer or plate, Z, attached to a thill, D. The upper surface of the plate Z inclines upward and inward slightly, and in its highest part is formed a notch to receive a projection formed upon the under side of the short end of the button Y to prevent the said button from being jarred out of position by the movement of the machine, when holding the teeth B away from the ground. The under side of the button Y is recessed around the pivot-hole to receive the small coiled spring $A'$, the upward pressure of which holds the projection of the button Y in the notch of the plate Z. $B'$ is the driver's seat, which is attached to the upper part of the bent or S-shaped spring $C'$. The lower end of the spring $C'$ rests upon the inclined flange of the bed-plate $D'$, where it is kept from lateral movement by the side flanges formed upon the said plate. Several holes are formed in the inclined flange of the plate $D'$ to receive the bolt by which the said spring is secured to the said flange, so that by simply shifting the said bolt from one to another of the said holes the seat $B'$ may be adjusted higher or lower, as may be desired, so that the driver can readily reach and operate the lever U with his feet.

Having thus described my invention, claim as my invention and desire to secure b Letters Patent—

1. The pivoted pawls, consisting of tooth H, block I, and spring J, in combination with the ratchet-wheels G attached to the hubs of the wheels C, and with the axle of a horse hay-rake, substantially as herein shown and described, and for the purpose set forth.

2. The hinge formed of the semicircular T-grooved piece E, and the semicircular T-flanged piece F, in combination with the axle and thills of a horse hay-rake, substantially as herein shown and described, and for the purposes set forth.

3. The combination of the extension-rods L, pivoted lever O, slotted and curved angle-lever P, and hand-lever Q with the pawl mechanism, consisting of tooth H, block I, and spring J to throw the latter into gear with the ratchet-wheels G of the wheels C, substantially as herein shown and described, and for the purpose set forth.

4. The combination of the outwardly-projecting branch or arm $o^2$ and curved or inclined plate S with the lever O, extension rods L, and pawl mechanism, consisting of tooth H, block I, and spring J to throw the latter out of gear with the ratchet-wheels G of the wheels C automatically, substantially as herein shown and described.

5. The combination of the slotted rigid arm T, lever U, pivoted connecting-bars W, and slotted rigid arm V with the axle A, to which the rake-teeth B are attached, substantially as herein shown and described, and for the purposes set forth.

RICHARD B. SHELDON.

Witnesses:
WM. T. NORTHUP,
M. A. CAMPBELL.